(12) United States Patent
Li et al.

(10) Patent No.: US 6,407,990 B1
(45) Date of Patent: Jun. 18, 2002

(54) METHOD OF TRANSMISSION OF IMAGE BY CDMA SYSTEM

(75) Inventors: Yingtao Li; Shengxi Pan; Bingyu Qu, all of Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 09/857,853

(22) PCT Filed: Oct. 17, 2000

(86) PCT No.: PCT/CN00/00336

§ 371 (c)(1),
(2), (4) Date: Jun. 11, 2001

(87) PCT Pub. No.: WO01/35671

PCT Pub. Date: May 17, 2001

(30) Foreign Application Priority Data

Nov. 11, 1999 (CN) .......................................... 99122300 A

(51) Int. Cl.⁷ ............................................... H04B 7/216
(52) U.S. Cl. .......................... 370/335; 370/479; 455/69
(58) Field of Search .................................. 370/203, 208, 370/332, 333, 320, 335, 342, 479; 375/130, 140, 141, 142, 143, 144, 145, 147, 149; 455/46, 552, 561, 436, 442, 63, 69

(56) References Cited

U.S. PATENT DOCUMENTS

| 4,901,307 | A | * | 2/1990 | Gilhousen et al. |
| 6,049,535 | A | * | 4/2000 | Ozukturk et al. |
| 6,212,174 | B1 | * | 4/2001 | Lomp et al. |

OTHER PUBLICATIONS

International Preliminary Examination Report (China), Mar. 16, 2001.*

* cited by examiner

*Primary Examiner*—William Luther
(74) *Attorney, Agent, or Firm*—Trop, Pruner & Hu, P.C.

(57) ABSTRACT

This invention discloses an image transmission method, which keeps the quality of the image transmission unchanged and increases the capacity for code division multiple access (CDMA) mobile communication system. By applying the subband coding with threshold method and differential perspective coding method, which change the image compression ratio and coding rate according to the characteristics of the image, the image transmission quality keeps unchanged. By changing the spread spectrum factor and adjusting the emission power accordingly or by applying the discontinuous emission mode without changing the spread spectrum factor, the purpose of increasing CDMA system capacity is reached.

12 Claims, 3 Drawing Sheets

METHOD OF TRANSMISSION OF IMAGE BY CDMA SYSTEM

FIELD OF THE INVENTION

The present invention relates generally to image compression coding technology and code division multiple access (CDMA) mobile communication technology, and more particularly to an implementation method for image compression coding and transmission which is adequate for the soft capacity characteristic of CDMA system.

BACKGROUND OF THE INVENTION

In image compression technology, if it is allowed a certain extent of distortion, then an image can be compressed in a certain extent. At the same time, considering each coded image frame, as their characteristics are different, so the compression ratio needs to be different. For example, images with different entropy may have different compression ratio; the one with larger entropy may have more compression and vise versa. Another example, for moving image, if the changes are slow, then the compression ratio can be higher than normal; this can be got by decreasing the frame rate of image coding. Therefore, in order to guarantee the quality of image transmission, different coded frame should have different compression ratio, i.e. the image coding rate should be different accordingly.

The CDMA digital mobile communication system has great potential power. In the CDMA system, system capacity is a soft capacity concept. For example, the system manager may raise the frame error rate to increase the available channels during peak hours of telephone traffic. Again, the CDMA system is a self-interference system, when its neighbor cells have less load, interference sent to the cell is smaller, so the capacity can be increased adequately. The soft capacity characteristic can be represented such as cell breath function, etc.

During the image transmission in CDMA system, the algorithm of digital image coding is a constant rate algorithm controlled by an external command, such as CCITT H.261 algorithm. This kind of algorithm controlled by an external command is impossible to consider the characteristics of the image itself, because the coding rate is a constant. Under maintaining the quality of image transmission greater than a certain threshold, it is limited raising of the CDMA system capacity in statistic sense. This is because maintaining image transmission quality, i.e. keeping the channel transmission quality unchanged, there is a certain proportional relationship between image coding rate with emission power. Changing the coding rate corresponds adjusting the emission power, so it is possible to increase the system capacity in statistic sense. As said above, the constant coding rate algorithm, controlled by external command, can not consider the characteristics of the image, this makes the soft capacity characteristic of the CDMA system has not been used greatly.

SUMMARY OF THE INVENTION

For constant image coding rate algorithm cannot be adequate of the soft capacity characteristic of CDMA system, the present invention provides an image transmission method which change image coding rate according to the characteristics of an image, in order to increase system capacity in statistic sense.

The invention proposes an image transmission method, which maintains the image transmission quality and increases the capacity of CDMA mobile communication system; the method comprises the steps of:
  (a) according to the characteristics of an image, make image coding with changing rate;
  (b) maintaining the channel transmission quality, change the spread spectrum factor and adjust the emission power accordingly, or use the discontinuous emission mode without changing the spread spectrum to increase the system capacity.

The invention also proposes an image transmission method, which maintains the image transmission quality and increases the capacity of CDMA mobile communication system; the method comprises the steps of:
  (1) according to the characteristics of an image, make image coding with changing rate;
  (2) according to the image coding rate, calculate spread spectrum factor;
  (3) according to the spread spectrum factor, change emission power;
  (4) transmit with the spread spectrum;
  (5) repeat steps (1) to (5) for the subsequent frame.

The invention still proposes an image transmission method, which maintains the image transmission quality and increases the capacity of CDMA mobile communication system; the method comprises the steps of:
  (1) according to the characteristics of an image, make image coding with changing rate;
  (2) according to the image coding rate, calculate interrupted point;
  (3) for interrupted transmitting signal, randomize and rearrange it within the frame with interleave algorithm;
  (4) transmit with spread spectrum;
  (5) repeat steps (1) to (5) for the subsequent frame.

The said image coding with changing rate may apply the subband coding with threshold method or the differential predictive coding method.

The said subband coding with threshold comprises at least the following steps:
  (1) divide the original image into different characteristic images;
  (2) according to the human vision and statistic result, set a threshold;
  (3) make image coding, the data less than the threshold is set to zero;
  (4) quantize the non-zero value and make compression coding.

The divided images may further be coded by the subband coding with threshold again.

In the said subband coding with threshold method, by increasing the threshold value, the image coding rate can be decreased to increase system capacity.

The said differential predictive coding method comprises at least the following steps:
  (1) calculate the difference of two timely successive frames;
  (2) set the threshold, according to the human vision and statistic result;
  (3) use the algorithm with low compression ratio when the calculated result of the differences in step (1) is greater than the threshold;
  (4) use the algorithm with high compression ratio when the calculated result of the differences in step (1) is smaller than the threshold.

As CDMA system is a self-interference system, its capacity is a soft capacity in concept, and there is a proportional relationship between its coding rate and emission power. When changing the coding rate and emission power, the system capacity is increased accordingly. Therefore, maintaining the image transmission quality, if the compression ratio of coding rate and coding rate are changed according to the specific characteristics of the image, then the compression ratio of the image will be further increased. In this way, the soft capacity of the CDMA system is possibly increased in statistic sense. As the present algorithm, controlled by external command does not take account of the image characteristics, so it does not utilize the soft capacity characteristic of the CDMA system greatly.

Using the image compression code transmission mode with changing coding rate of the invention, the stability of an image can be maintained and the capacity of the CDMA system will be increased in statistic sense.

THE DRAWINGS

DETAILED DESCRIPTION OF THE INVENTION

The invention changes the image compression ratio by using the characteristics of an image. At the same time, the coding rate is changed accordingly and the image transmission quality is keeping stably. The invention makes image coding by image compression method of subband coding with threshold or differential predictive coding.

Figure 1:
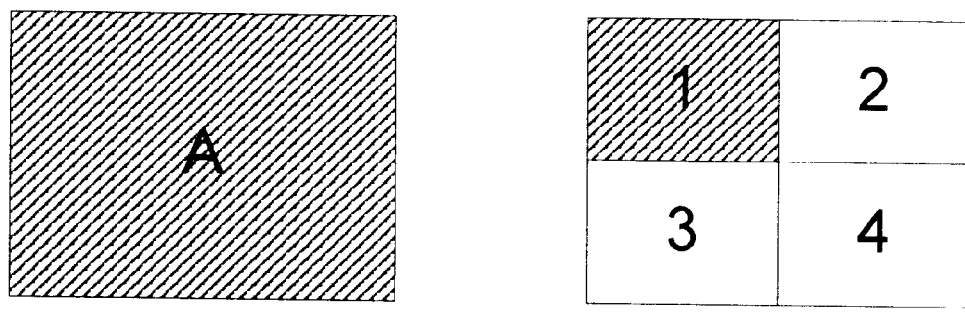
FIG. 1 shows the schematic process of subband coding with threshold.

The procedure of subband coding with threshold is shown in FIG. 1, the specific procedures are:

(a) Divide the original image A into four parts: image 1, 2, 3 and 4. The characteristics of each part are different; for example the frequency characteristic of each part is different after Fast Fourier Transform (FFT). The transform also includes Discrete Cosine Transform (DCT), Wavelet Transform etc. After transform, the characteristics of each part are different. Suppose part 1 is basically a shrunken image of image A, its data are very similar to the one of image A. Only a small portion of image 2 and 3 data are larger, others approximate to zero. And almost all data of image 4 approximate to zero.

(b) According to the human vision and statistic result, set a threshold x, for example set x equals to 0.2. After subband coding, in parts 1, 2, 3 and 4, those data, whose absolute value is less than the threshold, are set to zero.

After steps (a) and (b), the data is coded with some conventional method. When zero data in parts 1, 2, 3 and 4 are more, the coded data are less. As the characteristics of images are different, for example its entropy value is different; for a same threshold, their compression ratios are different. For example, the data of images 2 and 3 approximate to zero are more, so their compression ratios are larger; and almost all data of image 4 approximate to zero, so they are all set to zero according to the threshold.

Therefore, by setting the data less than the threshold to zero and only using the nonzero data to represent the image, the data volume representing the image are compressed.

Images 1 or 2, 3, 4 can be further coded by subband coding, each of them is divided into 4 parts again. As the data of image 2, 3 and 4 approximate to zero, so in general only image 1 is coded with subband coding again.

As the characteristics of the images are different, the image with smaller entropy has more data approximate to zero and the image with larger entropy has fewer data approximate to zero. Therefore, when setting a same threshold, the image with smaller entropy has higher compression ratio and lower coding rate corresponded; and the image with larger entropy has lower compression ratio and higher coding rate corresponded.

Setting a larger threshold, more detail information is discarded; if the quality of the image is decreased not so much, then the compression ratio of the image will be higher and the coding rate will be lower.

As there is certain proportional relationship between compression ratio and coding rate of the image. Using subband coding with constant threshold make different characteristic images, for example different entropy of image, have different compression ratio and coding rate. With this, the purpose of changing coding rate is reached, and the image quality after decoding is basically maintained.

Differential predictive coding is especially suitable for the moving images. The specific procedure is as follow: suppose moving images A and B are two successive frames, set d=distance (A, B) representing the difference of the images A and B, the distance function must satisfy the image vision relationship.

According to the human vision and a certain statistic algorithm, set a threshold X, whose function is similar to the one of threshold in the subband coding. When d>X, it represents that the difference between images A and B is larger and cannot be compressed too much, so a low compression ratio algorithm is used and the compression ratio is supposed to be K1. When d<X, it represents that the difference between images A and B is not too large, and increasing the compression ratio do not influence quality of the image; so a high compression ratio algorithm is used and the compression ratio is supposed to be K2. It is known from the mention above that K1<K2. Wherein the specific values of K1, K2 and X are related to the system requirement.

There are many image compression methods according to the values of K1 and K2, for example with the bit number of quantization to compress it, etc. In general, when the motion of the moving image is slow, after coding, data approximate to zero is more, so the compression ratio is higher.

By changing the threshold of subband coding method and differential predictive coding method, it can be implemented that the compression ratio and coding rate can be changed according to the image characteristics and the quality of the image keeps stable. At the same time, increasing the capacity of CDMA system in statistic sense becomes possible. In general, if an image frame has coding rate K1 and spread spectrum gain SF1, then when the coding rate is changed to K2, its spread spectrum gain should be changed to SF2 to keep the following relationship:

$$K1*SF1=K2*SF2 \tag{1}$$

This means when coding rate decreases, i.e. K<K1; then spread spectrum gain SF2 will increase.

In order to keep the transmission quality unchanged, the Signal/Noise Ratio must be unchanged, i.e. $E_b/N_0 = E_c/N_0 + 10 \log SF$ (dB) is unchanged, where $E_b$: each bit energy at the emission source of digital signal;

$N_0$: noise power spectrum density in channel;
$E_c$: spread spectrum chip energy of the digital signal after spread spectrum.

Suppose C=10 log K2/K1, when set $E_{c1}$ and $E_{c2}$ is the $E_c$ before and after changing the coding rate, respectively, then there is:

$$E_{c2}/N_0 = E_{c1}/N_0 + 10\log SF1/SF2 \quad (2)$$
$$= E_{c1}/N_0 + 10\log K2/K1$$
$$= E_{c1}/N_0 + C \text{ (dB)}$$

It has been seen, if C (dB) less than 0, i.e. K2<K1, then $E_{c2}$ must be less than $E_{c1}$. This means that when coding rate is changed, emission power must be changed accordingly. Especially, when coding rate is decreased, emission power must be also decreased accordingly.

Changing the logarithm operation above to general algebra operation, it is got:

$$E_{c2}=K2/K1*E_{c1}.$$

Therefore, in order to keep the transmission quality unchanged, it is necessary to change the spread spectrum gain and the emission power. The decreasing part of the emission power can be used for new user emission, in this way channel capacity is increased. For example, when the coding rate of image has a decrease of half, the emission power has also a decrease of half too, it means 50% conventional user can be increased in statistic sense.

Figure 2:
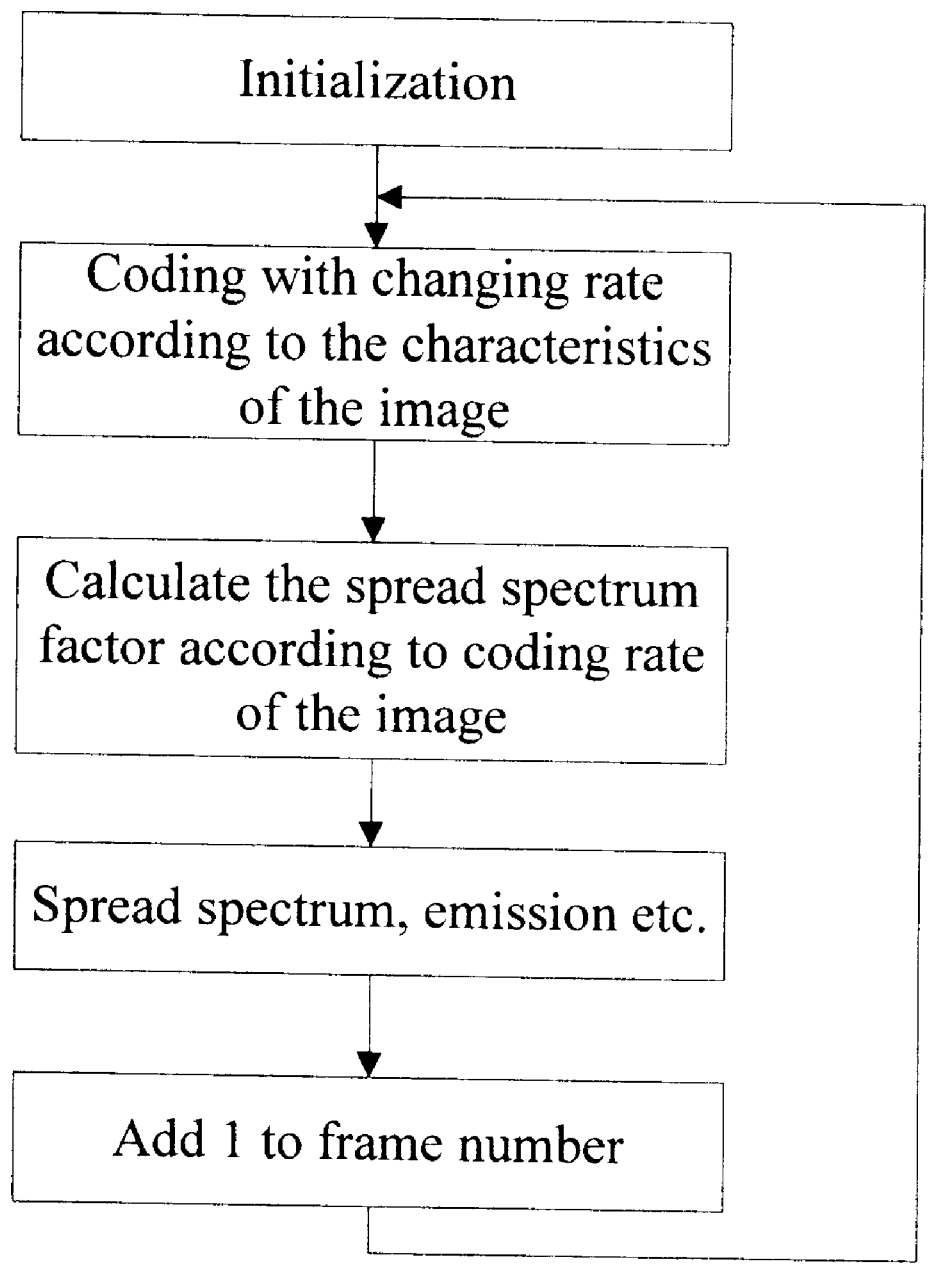
FIG. 2 shows the flowchart of changing the spread spectrum factor for increasing the system capacity.

The specific procedure of changing spread spectrum factor to increase system capacity is shown in FIG. 2. At first, the system is initialized. Then, make the coding with changing rate according to the characteristics of the image, i.e. using the subband coding with threshold and/or differential predictive coding said above. Successively, calculate the spread spectrum factor with formula (1) according to the coding rate of the image. Then, change the emission power, according to the relationship between emission power and spread spectrum factor in formula (2), and emit after spread spectrum. Finishing a frame coding and emitting, it returns to the point next to initialization and continues the next frame coding and emitting.

To keep the transmission quality of the channel, besides decreasing the emission power, the system can also apply the discontinuous transmitting technology, which means within an time interval sometimes signal is transmitted and sometimes signal is not transmitted. When the image frame rate is higher than 25 frames per second, human vision will not perceive the interrupt. Therefore, when the interrupt interval is less than 1/25 second, the human vision will not perceive the interrupt.

During the emission process, when the spread spectrum gain keeps unchanged, the time corresponding to the falling portion of the coding bit rate has no data. This can be used for discontinuous emission.

Figure 3:
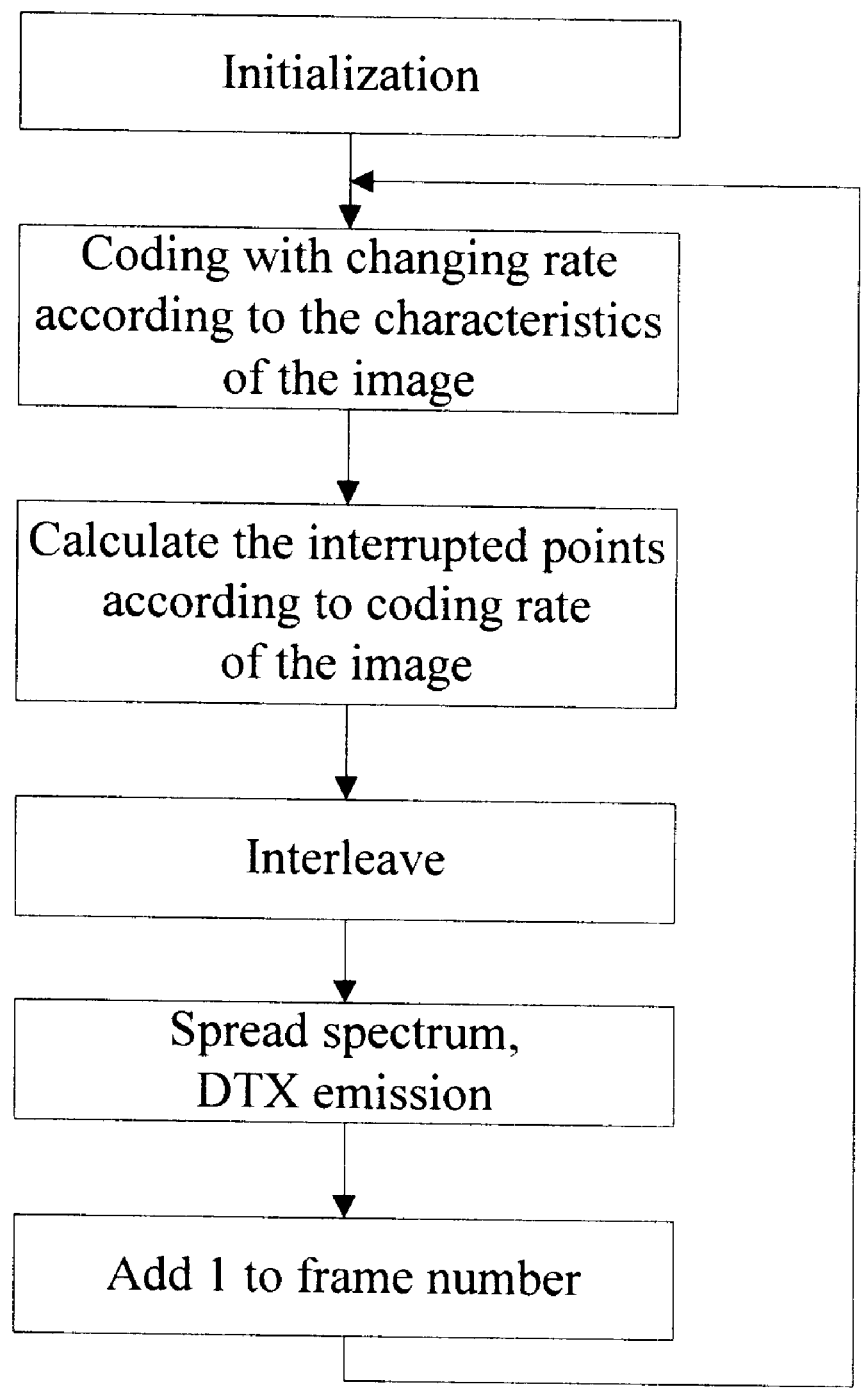
FIG. 3 shows the flowchart of using the discontinuous transmitting mode without changing the spread spectrum factor.

In the CDMA system, the procedure of discontinuous emission is shown in FIG. 3. The system is initialized first. Then, make the changing rate coding according to the characteristics of the image, i.e. using the subband coding with threshold and/or differential predictive coding said above. Successively, calculate the interrupted points according to the image coding rate; specifically, first calculate the starting point and ending point, then calculate the empty space between them. In this way the interrupted points are known. Then, make the interleave process, i.e. use the interleave algorithm to randomize and rearrange the bits to be transmitted within the frame. Finally, the bits are added to a spread spectrum address code and transmitted. The procedure of one frame coding and emitting is finished. The procedure then adds 1 to the frame and returns to the steps after initialization to make the next frame coding and emitting.

Although the emission power of a signal bit is unchanged, it is an interrupt emission. In this way, the interference of the whole CDMA system is decreased in statistic sense. The electromagnetic wave is decreased in the space, so the system capacity will be increased without influence the system performance.

The said above are the preferred embodiments only, so they do not limit the scope of the invention. Any modification, equivalence replacement and improvement with the spirit and principle of the invention should all be covered in the claims of the invention.

What is claimed is:

1. An image transmission method to increase the capacity of code division multiple access (CDMA) mobile communication system, wherein said method comprises the steps of:
   (a) according to the characteristics of an image, make image coding with changing rate;
   (b) maintaining the channel transmission quality, change the spread spectrum factor and adjust the emission power accordingly, or use the discontinuous emission mode without changing the spread spectrum to increase the system capacity.

2. The method of claim 1, wherein it is characterized that the said image coding with changing rate in step (a) applies the subband coding with threshold method, which comprises the steps of:
   (1) divide the original image into different characteristic images;
   (2) according to the human vision and statistic result, set a threshold;
   (3) make image coding, the data less than the threshold is set to zero;
   (4) quantize the non-zero value and make compression coding.

3. The method of claim 2, wherein it is characterized that: decreasing the image coding rate by increasing the threshold value to increase the system capacity.

4. The method of claim 2, wherein it is characterized that further comprises: the divided images are coded by the subband coding with threshold method.

5. The method of claim 4, wherein it is characterized that: decreasing the image coding rate by increasing the threshold value to increase the system capacity.

6. The method of claim 1, wherein it is characterized that the said image coding with changing rate said in step (a) applies the differential predictive coding method, which comprises the steps of:
   (1) calculate the difference of two timely successive frames;
   (2) set the threshold, according to the human vision and statistic result;
   (3) use the algorithm with low compression ratio when the calculated result of the differences in step (1) is greater than the threshold;
   (4) use the algorithm with high compression ratio when the calculated result of the differences in step (1) is smaller than the threshold.

7. The method of claim 1, wherein it is characterized that the said, in step (b), adjusting emission power with changing spread spectrum factor to increase the system capacity comprises the steps of:

according to the image coding rate, calculate spread spectrum factor;

according to the spread spectrum factor, change emission power;

transmit with the spread spectrum.

8. The method of claim 1, wherein it is characterized that the said, in step (b), using discontinuous emission mode to increase the system capacity comprises the steps of:

according to the image coding rate, calculate interrupted point;

for interrupted transmitting signal, randomize and rearrange it within the frame with interleave algorithm;

transmit with the spread spectrum.

9. An image transmission method to increase the capacity of CDMA mobile communication system, wherein said method comprises the steps of:

(1) according to the characteristics of an image, make image coding with changing rate;

(2) according to the image coding rate, calculate spread spectrum factor;

(3) according to the spread spectrum factor, change emission power;

(4) transmit with the spread spectrum;

(5) repeat steps (1) to (5) for the subsequent frame.

10. The method of claim 9, wherein it is characterized that the said, in step (1), image coding with changing rate applies the subband coding with threshold method or differential perspective coding method.

11. An image transmission method to increase the capacity of CDMA mobile communication system, wherein said method comprises the steps of:

(1) according to the characteristics of an image, make image coding with changing rate;

(2) according to the image coding rate, calculate interrupted point;

(3) for interrupted transmitting signal, randomize and rearrange it within the frame with interleave algorithm;

(4) transmit with spread spectrum;

(5) repeat steps (1) to (5) for the subsequent frame.

12. The method of claim 11, wherein it is characterized that the said, in step (1), image coding with changing rate applies the subband coding with threshold method or differential perspective coding method.

\* \* \* \* \*